United States Patent
Chang et al.

(10) Patent No.: US 7,274,745 B2
(45) Date of Patent: Sep. 25, 2007

(54) SINGLE-CARRIER RECEIVER HAVING A CHANNEL EQUALIZER INTERACTING WITH A TRELLIS DECODER AND A CHANNEL EQUALIZATION METHOD THEREFOR

(75) Inventors: Yong-deok Chang, Suwon (KR); Hae-joo Jeong, Seoul (KR); Yong-sik Kwon, Seoul (KR); Jin-hee Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 701 days.

(21) Appl. No.: 10/671,730

(22) Filed: Sep. 29, 2003

(65) Prior Publication Data

US 2004/0105507 A1   Jun. 3, 2004

Related U.S. Application Data

(60) Provisional application No. 60/430,359, filed on Dec. 3, 2002.

(51) Int. Cl.
*H04L 27/28* (2006.01)
*H04L 5/12* (2006.01)

(52) U.S. Cl. .............. 375/265; 375/229; 375/230; 375/232; 375/233

(58) Field of Classification Search ........ 375/229–236, 375/346–350, 265; 714/792
See application file for complete search history.

(56) References Cited

U.S. PATENT DOCUMENTS 5,644,603 A * 7/1997 Ushirokawa ............... 375/341
7,006,566 B2 * 2/2006 Birru ......................... 375/233

* cited by examiner

*Primary Examiner*—Jay K. Patel
*Assistant Examiner*—Curtis B. Odom
(74) *Attorney, Agent, or Firm*—Staas & Halsey LLP

(57) ABSTRACT

A channel equalizer for a single-carrier receiver interacting with a Trellis decoder and a channel equalization method therefor. The channel equalizer includes a first equalizer having a first feed forward (FF) unit for eliminating a pre-ghost of an input signal and a first feedback (FB) unit for eliminating a post-ghost of the input signal, a Trellis decoder for Trellis-decoding an output signal of the first equalizer, and a second equalizer having a second FF unit for eliminating the pre-ghost of the input signal and a second FB unit for eliminating the post-ghost of the input signal based on a signal decoded by the Trellis decoder. The first and second equalizers, interacting with the Trellis decoder, enable the equalization performance and speed of the channel equalizer to be enhanced.

32 Claims, 10 Drawing Sheets

SINGLE-CARRIER RECEIVER HAVING A CHANNEL EQUALIZER INTERACTING WITH A TRELLIS DECODER AND A CHANNEL EQUALIZATION METHOD THEREFOR

CROSS-REFERENCE TO RELATED APPLICATIONS

This application claims the benefit of U.S. Provisional Patent Application No. 60/430,359, filed on Dec. 3, 2002, in the U.S. Patent and Trademark Office, and claims benefit of Korean Patent Application No. P2003-3133, filed Jan. 16, 2003 in the Korean Intellectual Property Office, the disclosures of which are incorporated herein by reference.

BACKGROUND OF THE INVENTION

1. Field of the Invention

The present invention relates to a channel equalizer, and more particularly, to a channel equalizer interacting with a Trellis decoder.

2. Description of the Prior Art

FIG. 1 is an example of a conventional channel equalizer for a general single-carrier receiver, illustrating a schematic block diagram for a channel equalizer having a decision feedback equalizer (DFE).

The DFE-structured channel equalizer has a feed-forward (FF) unit 10, a feedback (FB) unit 30, an adder 50, a level decision unit 70, and an error calculation unit 90.

The FF unit 10 eliminates the pre-ghost influence for each symbol of an input signal and the FB unit 30 eliminates the post-ghost influence for each symbol of an input signal. The adder 50 adds a pre-ghost-free value of the FF unit 10 and a post-ghost-free value of the FB unit 30.

The level decision unit 70 determines an output signal having a level, of a plurality of preset levels, nearest to the value obtained at the adder 50. The level decision unit 70 feeds back the level-determined signal to the FB unit 30. The level decision unit 70 determines a preset level for an output signal corresponding to a set signal level, for example, 4-level, 8-level, 16-level, or the like.

The error calculation unit 90 calculates an equalization error value based on a signal output from the adder 50 and a signal output from the level decision unit 70. The calculated equalization error value is output to the FF unit 10 and the FB unit 30. The FF unit 10 and the FB unit 30 each update filter tap coefficients based on the inputted equalization error value.

This conventional DFE-structured channel equalizer has an advantage of having a fast convergence speed with relatively less taps. However, the accuracy of an estimation signal output to the FB unit 30, e.g., a feedback filter, greatly affects the equalization performance of a channel equalizer. Thus, a problem with this conventional DFE-structured channel equalizer is that if an incorrect estimation signal is input to the FB unit 30 from the level decision unit 70, e.g., due to noise, an error propagation phenomenon may occur, which will degrade the equalization performance of the channel equalizer.

SUMMARY OF THE INVENTION

The present invention has been devised to solve the above and/or problems. Therefore, it is an aspect of the present invention to provide a single-carrier receiver having a channel equalizer interacting with a Trellis decoder and a channel equalization method therefor.

Additional aspects and/or advantages of the invention will be set forth in part in the description which follows and, in part, will be obvious from the description, or may be learned by practice of the invention.

An additional aspect of the present invention is to provide a channel equalizer for a single-carrier receiver, including a first equalizer having a first feed forward (FF) unit to eliminate a pre-ghost of an input signal and a first feedback (FB) unit to eliminate a post-ghost of the input signal, a Trellis decoder for Trellis-decoding an output signal of the first equalizer, and a second equalizer having a second FF unit to eliminate the pre-ghost of the input signal and a second FB unit to eliminate the post-ghost of the input signal based on an output signal of the Trellis decoder.

A further aspect of the present invention is to provide a channel equalization method for a signal-carrier receiver, including first equalizing an input signal by eliminating pre-ghost and post-ghost of the input signal using a first feed forward (FF) unit and a first feedback (FB) unit, Trellis-decoding a result of the first equalizing of the input signal, and second equalizing a result of the Trellis-decoding, comprising eliminating the pre-ghost of the input signal in a second FF unit and eliminating the post-ghost of the input signal in a second FB unit based on the result of the Trellis-decoding.

Another aspect of the present invention is to provide a channel equalizer for a single-carrier receiver, including a first equalizer having a first FF unit to eliminate a pre-ghost of an input signal, a first FB unit to eliminate a post-ghost of the input signal, and a first error calculation unit to calculate a first equalization error value based on an added signal of an output signal of the first FF unit and an output signal of the first FB unit, a buffer to store the input signal input to the first equalizer for a certain period of time, a Trellis decoder having an entire decoding depth of N and an entire traceback delay symbol length of N×K, with N and K being natural numbers, and Trellis-decode an output signal of the first equalizer, a Trellis controller to control the Trellis decoder to output to the first FB unit an estimation signal output in a predetermined decoding depth state of the Trellis decoder if the first equalization error value becomes less than or equal to a threshold value, and a second equalizer having a second FF unit to eliminate the pre-ghost of the input signal output from the buffer and a second FB unit to eliminate the post-ghost of the input signal based on an output of the Trellis decoder.

An additional aspect of the present invention is to provide a channel equalizer for a single-carrier receiver, including a first equalizer having a first feed forward (FF) unit to eliminate a pre-ghost of an input signal, a first feedback (FB) unit to eliminate a post-ghost of the input signal, and a first error calculation unit to calculate a first equalization error value based on an added signal of an output signal of the first FF unit and an output signal of the first FB unit, a buffer to store the input signal input to the first equalizer for a certain period of time, a Trellis decoder having an entire decoding depth of N and an entire traceback delay symbol length of N×K, with N and K being natural numbers, and Trellis-decode an output signal of the first equalizer, a Trellis controller to control the Trellis decoder to output to the first FB unit plural estimation signals output in plural states of entire decoding depths of the Trellis decoder, if the first equalization error value becomes less than or equal to a threshold value, and a second equalizer having a second FF unit to eliminate the pre-ghost of the input signal output from the buffer and a second FB unit to eliminate the post-ghost of the input signal, based on an output of the Trellis decoder.

An additional aspect of the present invention is to provide a channel equalizer for a single-carrier receiver, including a first equalizer having a first feed forward (FF) unit to eliminate a pre-ghost of an input signal, and a first feedback (FB) unit to eliminate a post-ghost of the input signal, a buffer to store the input signal input to the first equalizer for a certain period of time, a Trellis decoder having a decoding depth of N and an entire traceback delay symbol length of N×K, with N and K being natural numbers, and to Trellis-decode an output signal of the first equalizer, a second equalizer having a second FF unit to eliminate the pre-ghost of the input signal output from the buffer, a second FB unit to eliminate the post-ghost of the input signal based on an output of the Trellis decoder, and a second error calculation unit to calculate a second equalization error value based on the output of the Trellis decoder.

An additional aspect of the present invention is to provide a channel equalizer for a single-carrier receiver, including a first equalizer having a first feed forward (FF) unit to eliminate a pre-ghost of an input signal, a first feedback (FB) unit to eliminate a post-ghost of the input signal, and a first error calculation unit to calculate a first equalization error value based on an added signal of an output signal of the first FF unit and an output signal of the first FB unit, a buffer for storing the input signal input to the first equalizer for a certain period of time, a Trellis decoder having an entire decoding depth of N and an entire traceback delay symbol length of N×K, with N and K being, and Trellis-decode an output signal of the first equalizer, a Trellis controller to control the Trellis decoder to output to the first FB unit an estimation signal output in a predetermined decoding depth state of the Trellis decoder if the first equalization error value becomes less than or equal to a threshold value, and a second equalizer having a second FF unit to eliminate the pre-ghost of the input signal output from the buffer, a second FB unit to eliminate the post-ghost of the input signal based on an output of the Trellis decoder, and a second error calculation unit to calculate a second equalization error value based on the output of the Trellis decoder.

An additional aspect of the present invention is to provide a channel equalizer for a single-carrier receiver, including a first equalizer having a first feed forward (FF) unit to eliminate a pre-ghost of an input signal, a first feed back (FB) unit to eliminate a post-ghost of the input signal, and a first error calculation unit to calculate a first equalization error value based on an added signal of an output signal of the first FF unit and an output signal of the first FB unit, a buffer to store the input signal input to the first equalizer for a certain period of time, a Trellis decoder having an entire decoding depth of N and an entire traceback delay symbol length of N×K, with N and K being natural numbers, and to Trellis-decode an output signal of the first equalizer, a Trellis controller to control the Trellis decoder to input to the first FB unit plural estimation signals output in plural states of the entire decoding depths of the Trellis decoder, if the first equalization error value becomes less than or equal to a threshold value, and a second equalizer having a second FF unit to eliminate the pre-ghost of the input signal output from the buffer, a second FB unit to eliminate the post-ghost of the input signal based on an output of the Trellis decoder, and a second error calculation unit to calculate a second equalization error value based on the output of the Trellis decoder.

An additional aspect of the present invention is to provide a receiver, including a demodulator to convert a received signal to a baseband signal, a channel equalizer to compensate for channel distortions in the demodulated received signal, a phase recovery unit to recover a phase of the channel equalized signal, and a decoder to decode the phase recovered signal, wherein the channel equalizer further comprises a first equalizer having a first feed forward (FF) unit to eliminate a pre-ghost of a channel equalizer input signal and a first feedback (FB) unit to eliminate a post-ghost of the channel equalizer input signal, a Trellis decoder to Trellis-decode an output signal of the first equalizer, and a second equalizer having a second FF unit to eliminate the pre-ghost of the channel equalizer channel equalizer signal and a second FB unit to eliminate the post-ghost of the channel equalizer input signal based on an signal decoded by the Trellis decoder.

BRIEF DESCRIPTION OF THE DRAWINGS

These and/or other aspects and advantages of the invention will become more apparent and more readily appreciated from the following embodiments, taken in conjunction with the accompanying drawings in which.

DETAILED DESCRIPTION OF THE PREFERRED EMBODIMENT

Figure 1:
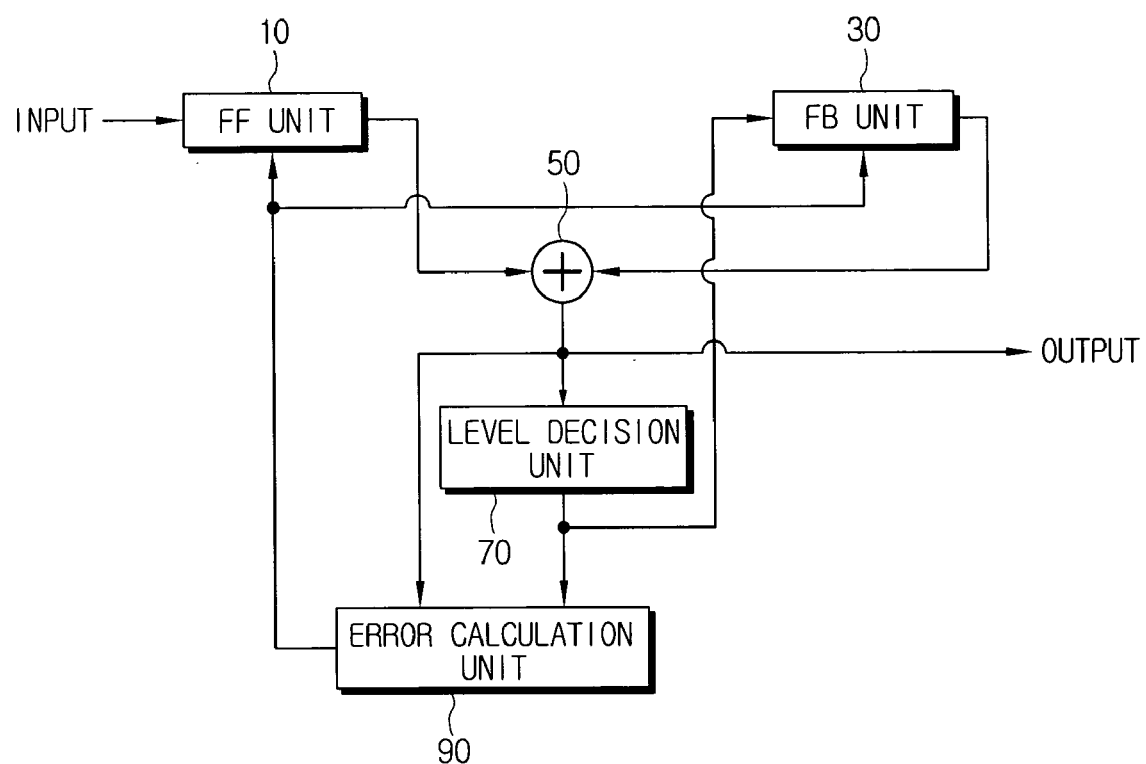
FIG. 1 is a block diagram of a conventional channel equalizer for a single-carrier receiver.

Preferred embodiments of the present invention will be now be described in detail with reference to attached drawings. Like reference numerals refer to like elements throughout.

Figure 2:
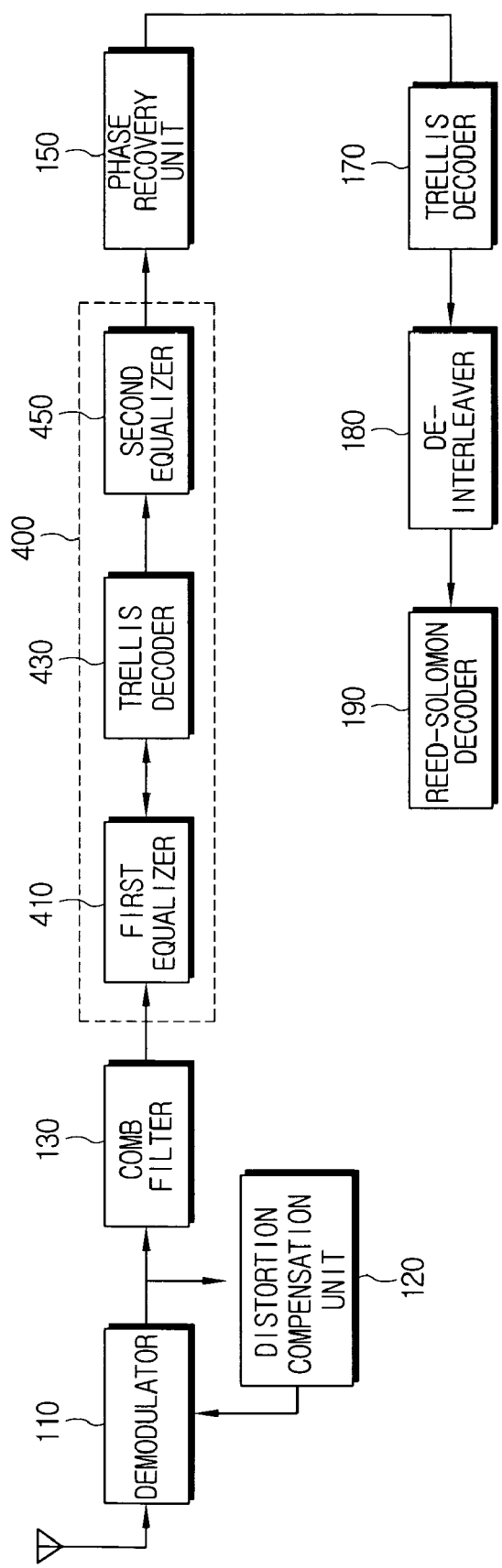
FIG. 2 is a block diagram of a single-carrier receiver according to an embodiment of the present invention.

FIG. 2 is a block diagram of a vestigial side-band (VBS) receiver, for example, of a single-carrier receiver, having a channel equalizer interacting with a Trellis decoder, according to an embodiment of the present invention.

A VSB receiver has a demodulator 110, a distortion compensation unit 120, a comb filter 130, a channel equalizer 400, a phase recovery unit 150, a Trellis decoder 170, a de-interleaver 180, and a Reed-Solomon decoder 190.

The demodulator 110 converts a received RF-band broadcast signal to a baseband signal. The distortion compensation unit 120 recovers a segment synchronization signal, a field synchronization signal, symbol timings, etc., for the baseband signal output from the demodulator 110. The comb filter 130 eliminates an NTSC interference signal from the baseband signal output from the demodulator 110.

The channel equalizer 400 has at least a first equalizer 410, a Trellis decoder 430, and a second equalizer 470, and compensates for channel distortions occurring during broadcast signal transmissions through a transmission channel. The phase recovery unit 150 recovers the phase of the broadcast signal for which channel distortions are compensated.

The Trellis decoder 170 Trellis-decodes the phase-recovered broadcast signal. The de-interleaver 180 de-interleaves the Trellis-decoded broadcast signal in correspondence to interleaving carried out at the transmission side. The Reed-Solomon decoder 190 decodes the de-interleaved broadcast signal in correspondence to a Reed-Solomon decoding for the broadcast signal, as implemented at the transmission side.

Detailed descriptions will now be made of channel equalizers interacting with a Trellis decoder, according to embodiments of the present invention.

Figure 3:
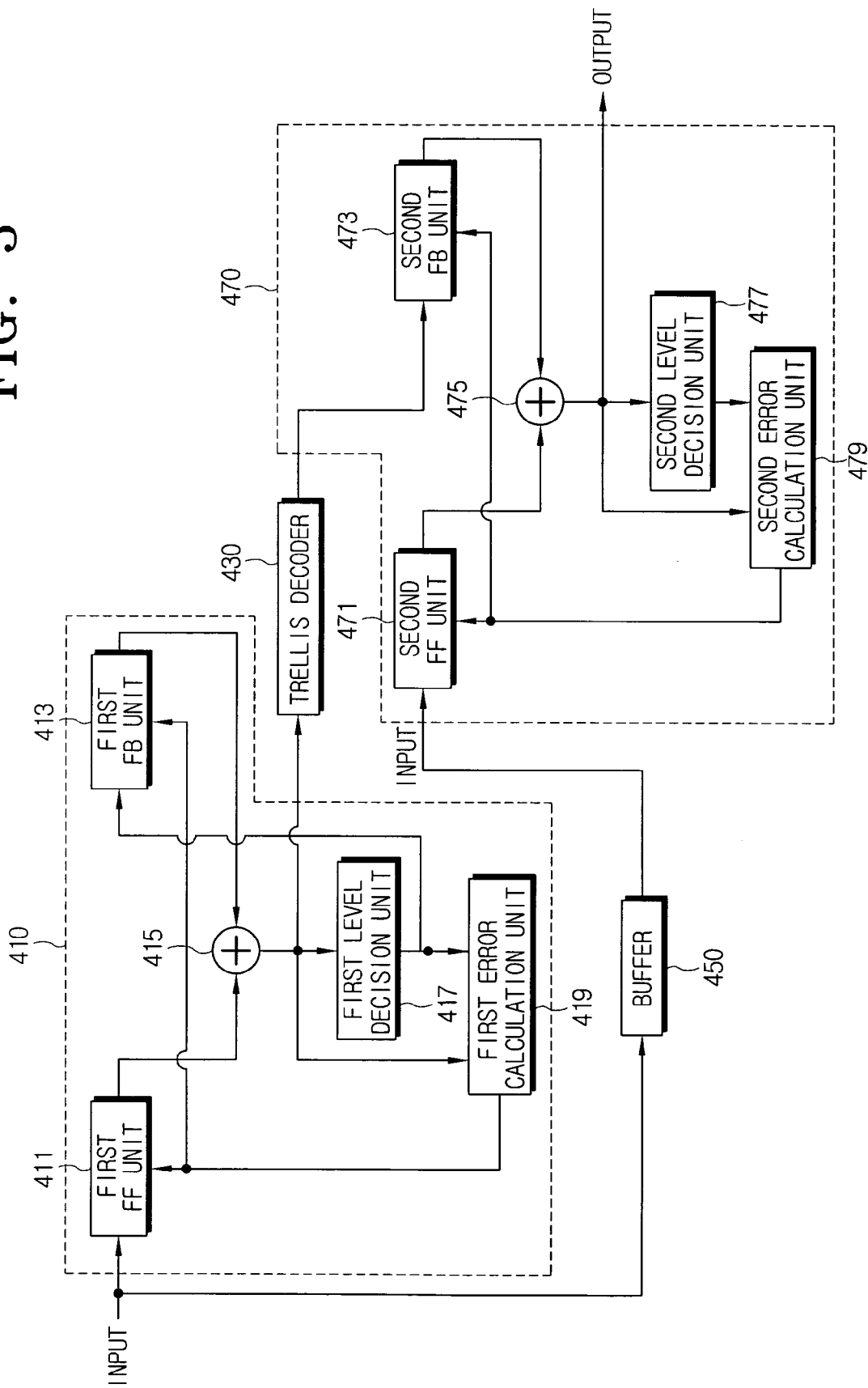
FIG. 3 is a block diagram of a channel equalizer for the single-carrier receiver of FIG. 2, according to an embodiment of the present invention.

FIG. 3 is a block diagram of the channel equalizer 400, according to an embodiment of the present invention.

The channel equalizer 400 has a first equalizer 410, a Trellis decoder 430, a buffer 450, and a second equalizer 470.

The first equalizer 410 has at least a first FF unit 411, a first FB unit 413, a first adder 415, a first level decision unit 417, and a first error calculation unit 419.

The first FF unit 411 eliminates the pre-ghost of an input signal, and the first FB unit 413 eliminates the post-ghost of the input signal.

The first adder 415 adds the output signals of the first FF unit 411 and the first FB unit 413, and generates an output signal of the first equalizer 410. The first level decision unit 417 determines a preset level corresponding to the signal added in the first adder 415, with a level-determined signal being fed back to the first FB unit 413. The first error calculation unit 419 calculates a first equalization error value based on the output signals of the first adder 415 and the first level decision unit 417. The calculated first equalization error value is output to the first FF unit 411 and the first FB unit 413. The first FF unit 411 and the first FB unit 413 update filter tap coefficients according to the output first equalization error value, and eliminate the pre-ghost and post-ghost of the input signal.

Figure 4:
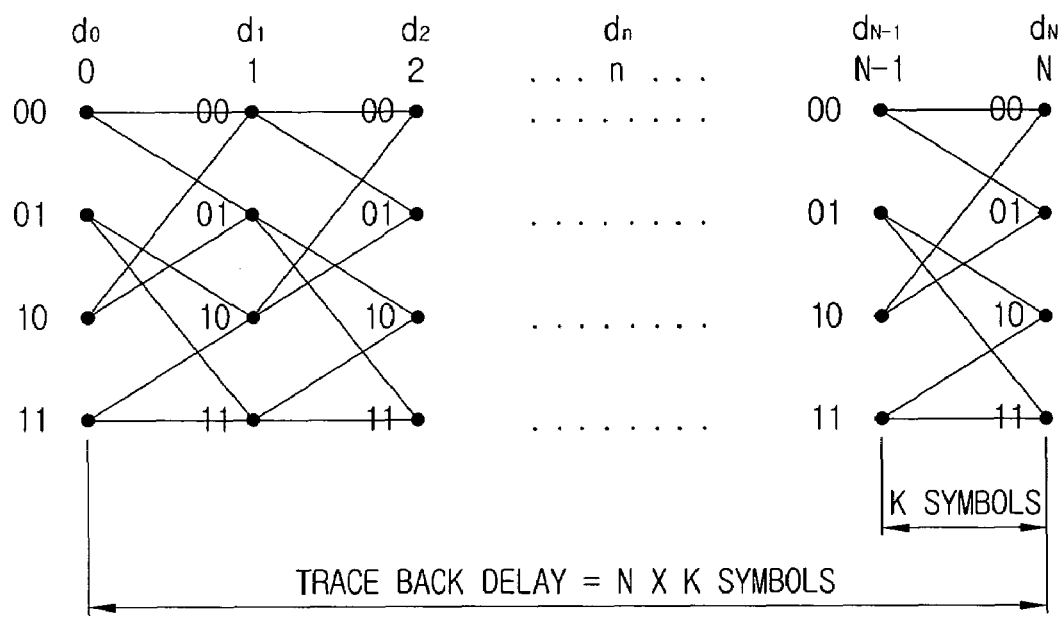
FIG. 4 illustrates a Trellis decoder for the single-carrier receiver of FIG. 2, according to an embodiment of the present invention.

The output signal of the first equalizer 410, which is output from the first adder 415, is output to the Trellis decoder 430. The Trellis decoder 430 Trellis-decodes the output signal of the first equalizer 410. The Trellis decoder 430, applied to the channel equalizer, according to the present embodiment, as shown in FIG. 4, will be described herein according to the situation where the de-interleaving is carried out by a unit of K symbols and the states of decoding depth are 0, 1, 2, 3, . . . , or N. The entire traceback delay of the Trellis decoder, thereby, becomes K×N symbols.

The output signal of the first equalizer 410, Trellis-decoded through the Trellis decoder 430, is output to a second FB unit 473 of the second equalizer 470.

The second equalizer 470 has at least a second FF unit 471, a second FB unit 473, a second adder 475, a second level decision unit 477, and a second error calculation unit 479.

The second FF unit 471 eliminates the pre-ghost of the input signal, as output from the buffer 450, and the second FB unit 473 eliminates the post-ghost of the input signal, as output from the buffer 450, based on a Trellis-decoded signal of the Trellis decoder 430. The second adder 475 adds the output signals of the second FF unit 471 and the second FB unit 473 and outputs an output signal of the second equalizer 470, thereby, outputting the output of the channel equalizer 400.

The second level decision unit 477 determines a preset level corresponding to the signal added in the second adder 475. The level-determined signal is then output to the second error calculation unit 479. That is, the second FB unit 473 inputs a signal Trellis-decoded by the Trellis decoder 430, to prevent error propagation. The error propagation may occur when the level decision unit 477 determines an incorrect level for the signal added in the second adder 475.

The second error calculation unit 479 calculates the second equalization error value based on the output signals of the second adder 475 and the second level decision unit 477. The calculated second equalization error value is output to the second FF unit 471 and the second FB unit 473. The second FF unit 471 and the second FB unit 473 update respective filter tap coefficients according to the inputted second equalization error value, and eliminate the pre-ghost and post-ghost of an input signal.

Accordingly, the input of a Trellis-decoded signal to the second FB unit 473, of the second equalization unit 470, enhances an equalization convergence speed as well as equalization performance.

Figure 5:
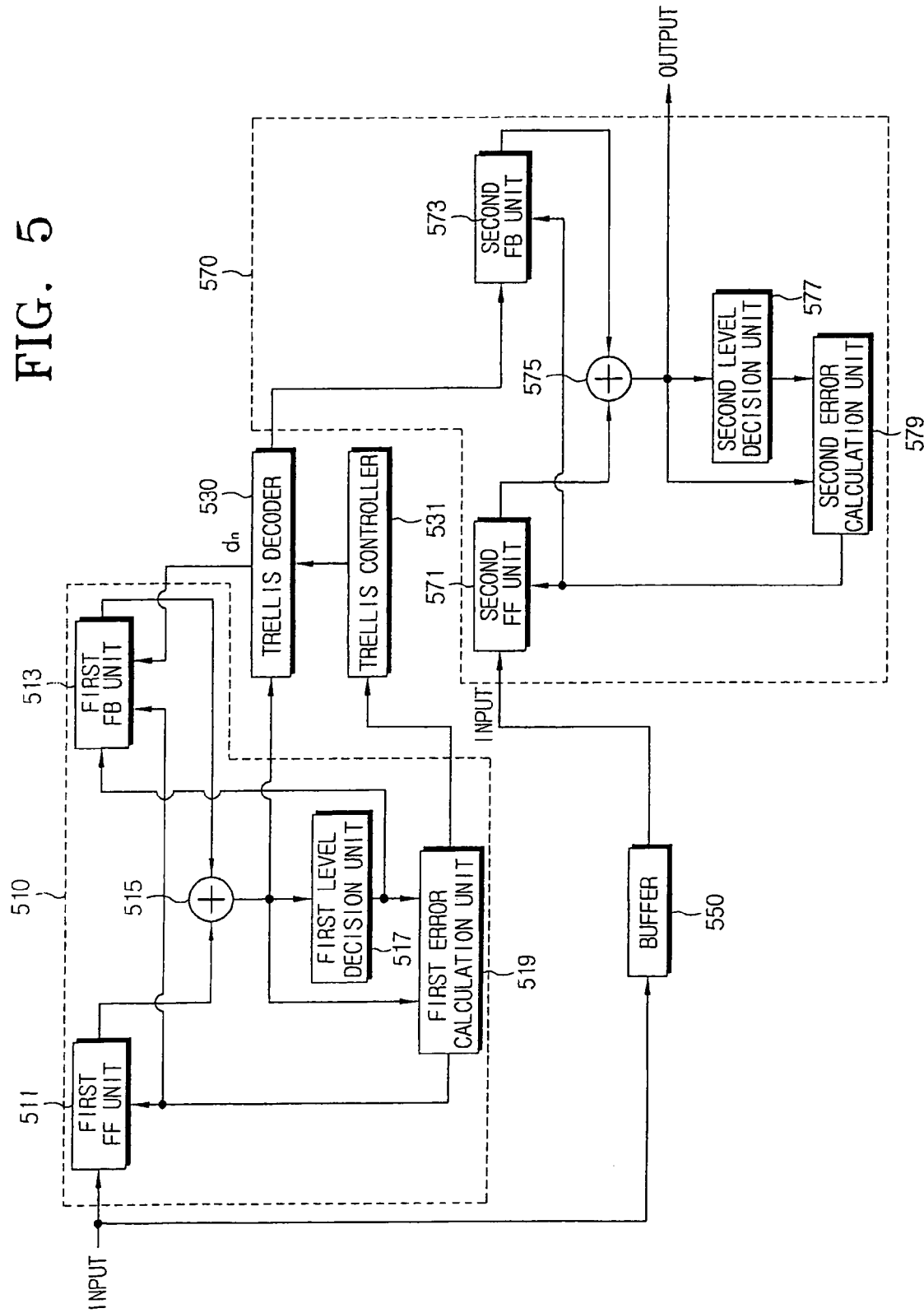
FIG. 5 is a block diagram illustrating a channel equalizer for the single-carrier receiver of FIG. 2, according to another embodiment of the present invention.

FIG. 5 is a block diagram illustrating a channel equalizer 500, in detail, according to a second embodiment of the present invention.

The channel equalizer 500 has a first equalizer 510, a Trellis decoder 530, a Trellis controller 531, a buffer 550, and a second equalizer 570.

The first equalizer 510 has a first FF unit 511 for eliminating the pre-ghost of an input signal, a first FB unit 513 for eliminating the post-ghost, a first adder 515 for adding the output signals of the first FF unit 511 and the first FB unit 513 and outputting an output signal of the first equalizer 510, a first level decision unit 517 for determining a preset level corresponding to a signal added in the first adder 515 and providing a level-determined signal to the first FB unit 513, and a first error calculation unit 519. The first error calculation unit 519 uses output signals of the first adder 515 and the first level decision unit 517 to calculate and provide the first equalization error value to the first FF unit 511 and the first FB unit 513.

The output signal of the first equalizer 510, outputted from the first adder 515, is thereafter decoded by the Trellis decoder 530.

The Trellis controller 531 controls the Trellis decoder 530 to output a Trellis-decoded estimation signal to the first FB unit 513, based on the first equalization error value calculated in the first error calculation unit 519, if the first equalization error value becomes less than a threshold value.

In general, if a symbol error rate (SER) is compared between a signal decoded in the Trellis decoder 530 and a signal level determined by the first level decision unit 517, over time, the symbol error rate has a different result value before and after a certain time. That is, a symbol error rate of a signal level determined by the first level decision unit 517, before a certain time, is less than or equal to a symbol error rate of a signal decoded by the Trellis decoder 530, while a symbol error rate of a signal decoded by the Trellis decoder 530 becomes lower after the certain time.

According to the symbol error rate characteristics of the first level decision unit 517 and the Trellis decoder 530, over time, the Trellis controller 531 controls the Trellis decoder 530 based on a first equalization error value calculated in the first error calculation unit 519 in order to input a Trellis-decoded signal having a symbol error rate to the first FB unit 513, after the certain time.

According to the control of the Trellis control unit 531, the Trellis decoder 530 outputs to the first FB unit 513 an estimation signal decoded at an nth decoding depth.

If the Trellis decoder 530 is represented as shown in FIG. 4, an estimation signal dn decoded at a nth decoding depth has a traceback delay symbol length of n×K (symbol unit), and is inputted to a $\{1+(n\times K)\}^{th}$ filter tap of the first FB unit 513, accordingly.

The first FB unit 513 carries out ghost eliminations based on the estimation signal dn having a low symbol error rate after the $\{1+(n\times K)\}^{th}$ filter tap.

By inputting the estimation signal dn of the Trellis decoder 530, having a low symbol error rate, to a corresponding filter tap of the first FB unit 513, in consideration of a traceback delay length, to prevent error propagation phenomenon occurrences in the first FB unit 513, due to the errors of the first level decision unit 517.

Thereafter, the output signal of the first equalizer 510, based on the outputs of the first FF unit 511 and the first FB unit 513 being added by the first adder 515, is decoded through the Trellis decoder 530 and output to the second FB unit 573 of the second equalizer 570.

Detailed descriptions of the equalization process by the second equalizer 570 are omitted herein, as the process can be the same as that for the second equalizer 470 of the embodiment illustrated in FIG. 3. As a result, a signal Trellis-decoded by the Trellis decoder 530 is output to the second FB unit 573 to prevent the error propagation phenomenon of the second FB unit 573, due to the error of the second level decision unit 577. Accordingly, the equalization performance of the channel equalizer 500 can be enhanced over conventional systems.

Figure 6:
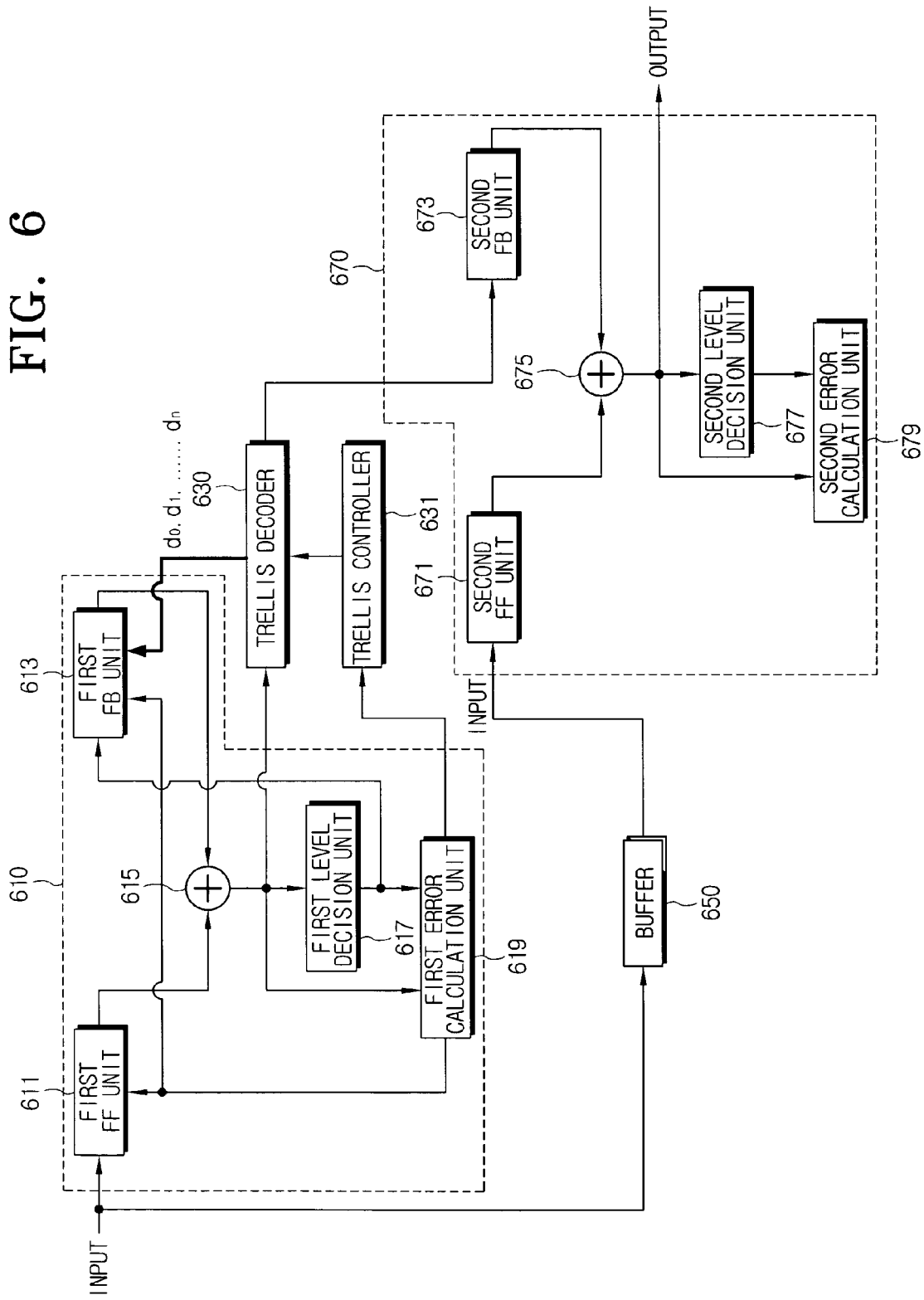
FIG. 6 is a block diagram illustrating a channel equalizer for the single-carrier receiver of FIG. 2, according to still another embodiment of the present invention.

FIG. 6 is a block diagram showing a channel equalizer 600, according to another embodiment of the present invention.

The channel equalizer 600 has at least a first equalizer 610, a Trellis decoder 630, a Trellis controller 631, a buffer 650, and a second equalizer 670.

The first equalizer 610 has a first FF unit 611, for eliminating the pre-ghost of an input signal, a first FB unit 613 for eliminating the post-ghost, a first adder 615 for adding the output signals of the first FF unit 611 and the first FB unit 613, representing an output signal of the first equalizer 610, a first level decision unit 617 for determining a preset level corresponding to an output of the first adder 615 and providing a level-determined signal to the first FB unit 613, and a first error calculation unit 619. The first error calculation unit 619 uses the output signals of the first adder 615 and the first level decision unit 617 to calculate and provide a first equalization error value to the first FF unit 611 and the first FB unit 613.

An output signal of the first equalizer 610, which is output from the first adder 615, is Trellis-decoded by the Trellis decoder 630.

The Trellis controller 631 controls the Trellis decoder 630 to output plural Trellis-decoded estimation signals to the first FB unit 613, if the first equalization error value calculated in the first error calculation unit 619 becomes less than or equal to a threshold value.

The plural estimation signals, decoded by the Trellis decoder 630, are output to the respective filter taps of the first FB unit 613, in correspondence to a traceback delay length of the Trellis decoder 630.

For example, in the Trellis decoder 630 shown in FIG. 4, if plural decoding depth states, arbitrarily set out of the entire decoding depth states, of 0, 1, 2, 3, 4, . . . , and N are 0, 1, 2, . . . , and n, the estimation signals decoded in the states of 0, 1, 2, . . . , and n become d0, d1, . . . , and dn. In this case, the estimation signal d0 output in the state of decoding depth "0" is output to the first filter tap of the first FB unit 613, and the estimation signal d1 output in the state of decoding depth "1" is output to the (1+K)th filter tap of the K symbol unit.

The estimation signal dn, output in the state of decoding depth "n," is output to a filter tap corresponding to a traceback delay symbol length $\{1+(n\times K)\}$ of the filter taps of the first FB unit 613.

Accordingly, the plural estimation signals of the Trellis decoder 630, having a low symbol error rate, are output to the plural filter taps corresponding to the first FB unit 613, according to the control of the Trellis controller 631, to prevent the error propagation phenomenon occurring in the first FB unit 613, due to the errors of the first level decision unit 617.

Thereafter, an output signal of the first equalizer 610, which is output from the first adder 615, is Trellis-decoded through the Trellis decoder 630 and output to the second FB unit 673, of the second equalizer 670.

Detailed descriptions of the equalization process by the second equalizer 670 are omitted herein, as the process can be the same as that for the second equalizer 470 of the embodiment illustrated in FIG. 3. As a result of the equalization process, a signal Trellis-decoded by the Trellis decoder 630 is output to the second FB unit 673 to prevent error propagation phenomenon occurrences in the second FB unit 673, due to the error of the second level decision unit 677. Accordingly, the equalization performance of the channel equalizer 600 is enhanced over conventional systems.

Figure 7:
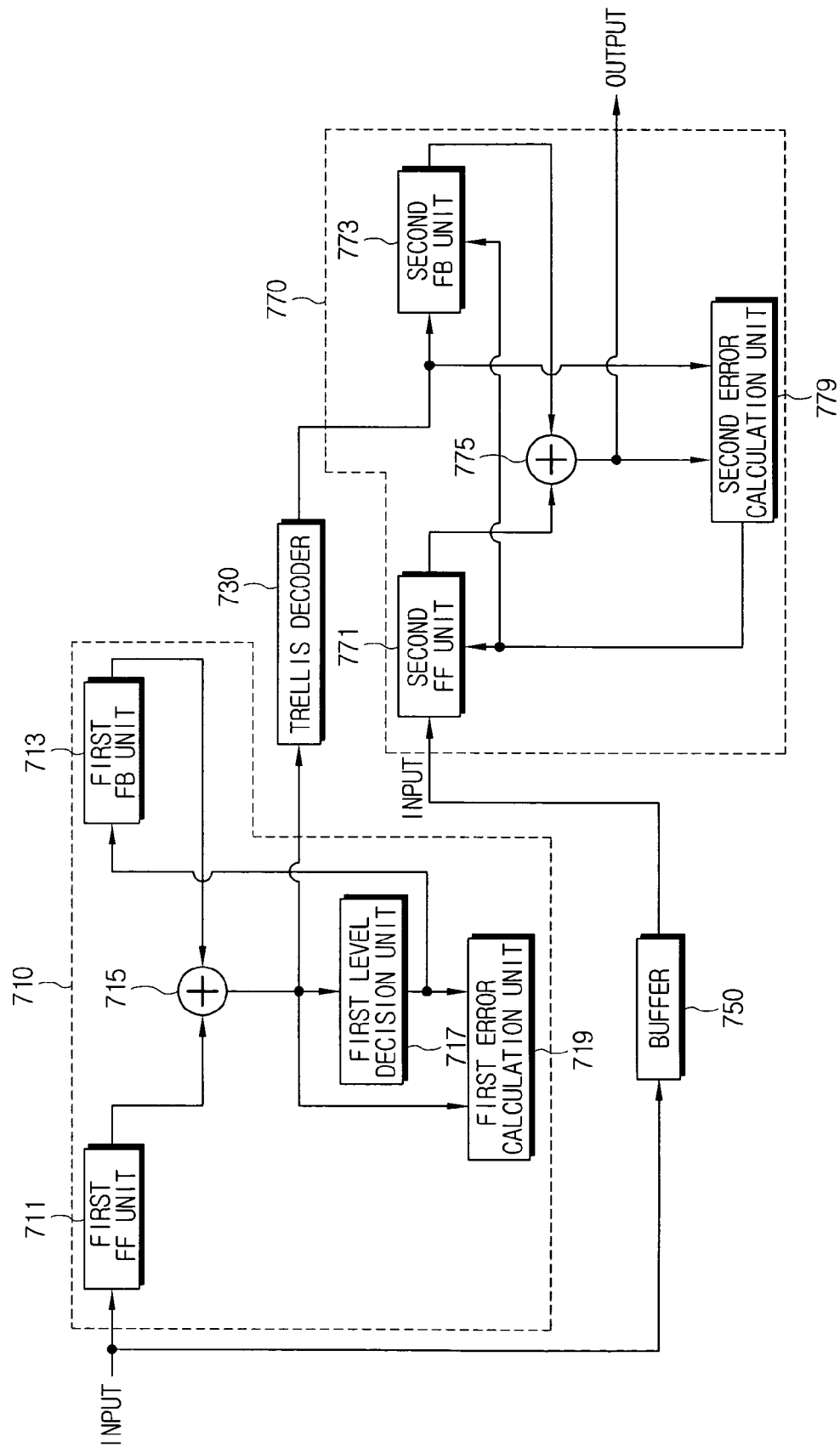
FIG. 7 is a block diagram illustrating a channel equalizer for the single-carrier receiver of FIG. 2, according to yet another embodiment of the present invention.
Figure 8:
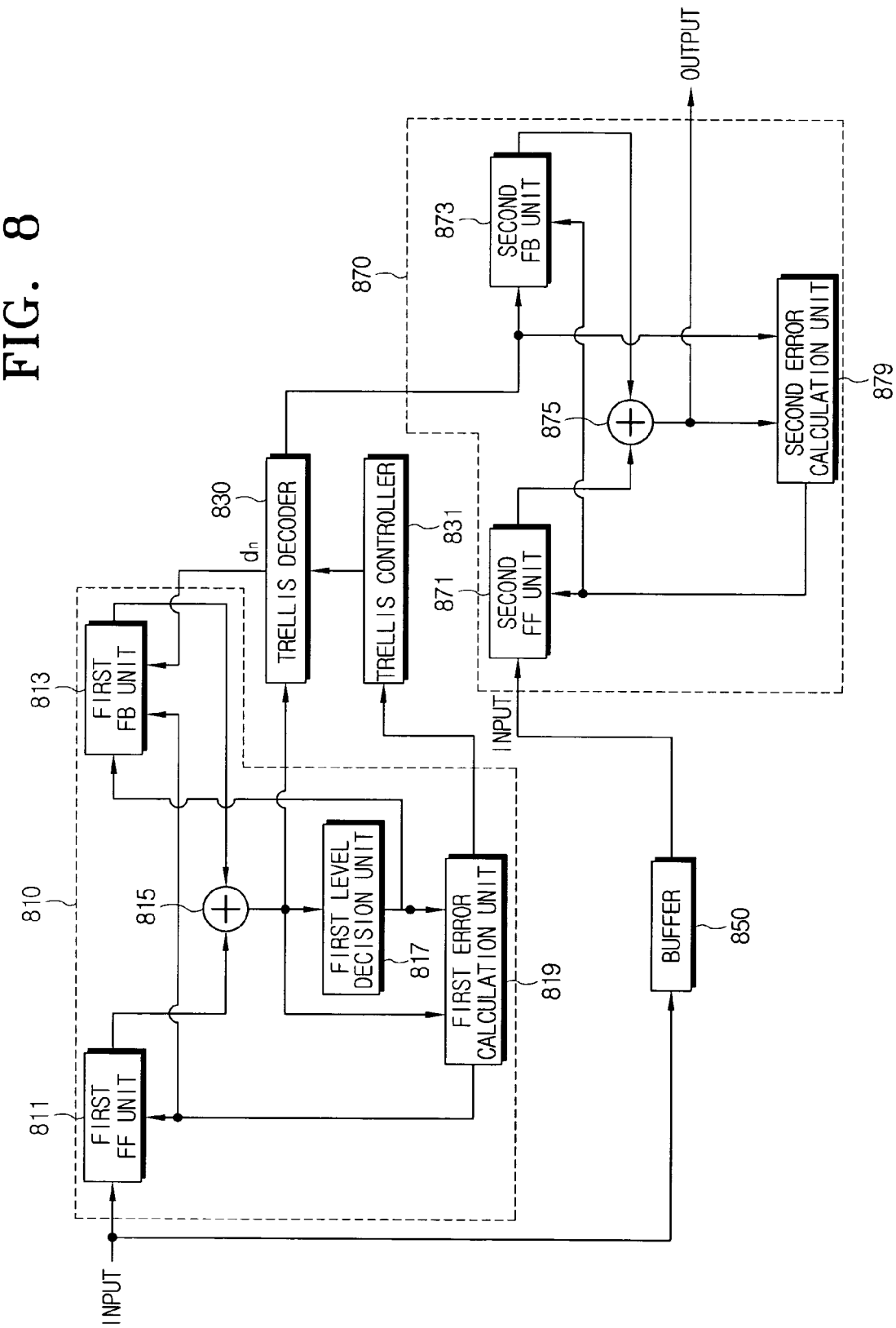
FIG. 8 is a block diagram illustrating a channel equalizer for the single-carrier receiver of FIG. 2, according to another embodiment of the present invention.
Figure 9:
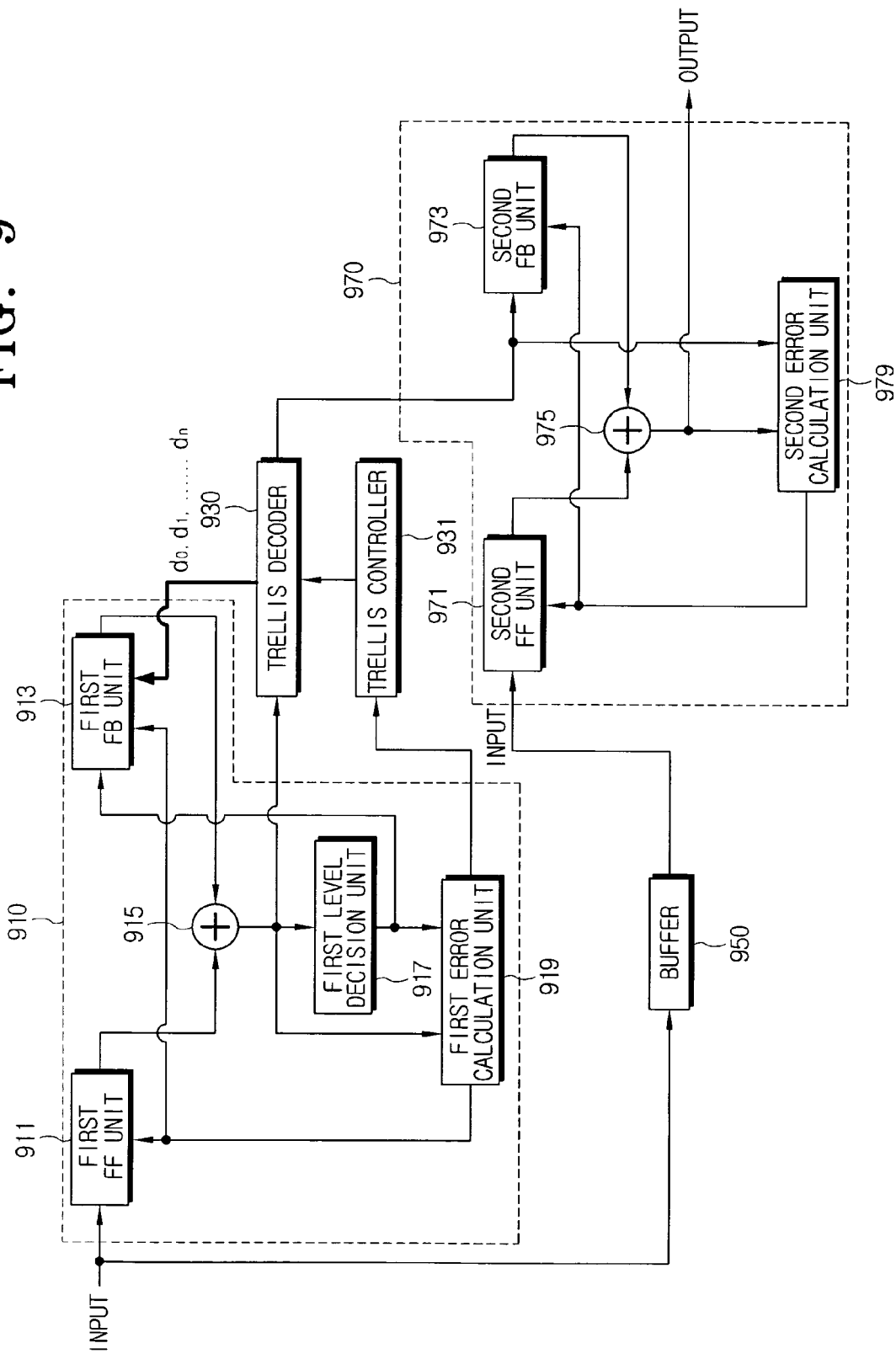
FIG. 9 is a block diagram illustrating a channel equalizer for the single-carrier receiver of FIG. 2, according to another embodiment of the present invention.

FIGS. 7-9 respectively illustrate block diagrams of channel equalizers 700, 800, and 900, according to additional embodiments of the present invention. Respectively, the channel equalizers 700, 800, and 900, shown in FIGS. 7-9, first equalizers 710, 810, and 910, Trellis decoders 730, 830, and 930, Trellis controllers 831, 931, and buffers 750, 850, and 950 have the same structures and operations as the first equalizers 410, 510, and 610, the Trellis decoders 430, 530, and 630, the Trellis controllers 531 and 631, and the buffers 450, 550, and 650, of the channel equalizers 400, 500, and 600 of the embodiments of the present invention shown in FIGS. 3, 5 and 6. Accordingly, detailed descriptions are omitted herein.

Second equalizers 770, 870, and 970, of the channel equalizers 700, 800, and 900, respectively, have different structures and operations compared to the second equalizers 470, 570, and 670, of the aforementioned channel equalizers 400, 500, and 600.

Hereinafter, descriptions will be made on the structures and operations of the second equalizers 770, 870, and 970, of the channel equalizers 700, 800, and 900, respectively, by focusing on the second equalizer 770, shown in FIG. 7.

The second equalizer 770 at least has a second FF unit 771, a second FB unit 773, a second adder 775, and a second error calculation unit 779.

The second FF unit 771 eliminates the pre-ghost for an input signal of the first equalizer 710, output from the buffer 750 after a predetermined time.

The second FB unit 773 inputs a Trellis-decoded signal, from the Trellis decoder 730, and eliminates the post-ghost for an input signal of the first equalizer 710, which is output from the buffer 750, based on the Trellis-decoded signal.

The second adder 775 adds the output signals from the second FF unit 771 and the second FB unit 773, and outputs an output signal of the second equalizer 770, representing the output of the channel equalizer 700.

The second error calculation unit 779 calculates the second equalization error value, based on a signal output from the second adder 775 and a Trellis-decoded signal output from the Trellis decoder 730. The calculated second equalization error value is output to the second FF unit 771 and the second FB unit 773. The second FF unit 771 and the second FB unit 773 update respective filter tap coefficients corresponding to the output second equalization error value, to implement equalizations.

The Trellis-decoded signal, by the Trellis decoder 730, is output to the second FB unit 773 to prevent the occurrences of an error propagation phenomenon in the second FB unit 773, due to the error of the second level decision unit 777. Since the second error calculation unit 779 calculates the second equalization error value based on the Trellis-decoded signal, the equalization convergence speed and equalization performance of the second FF unit 771 and the second FB unit 773 are enhanced over conventional systems.

The second equalizers 870 and 970 of FIG. 8 and FIG. 9 have the same structures and operations as the second equalizer 770 of FIG. 7, so the detailed descriptions on the equalizers 870 and 970 are omitted herein.

Figure 10:
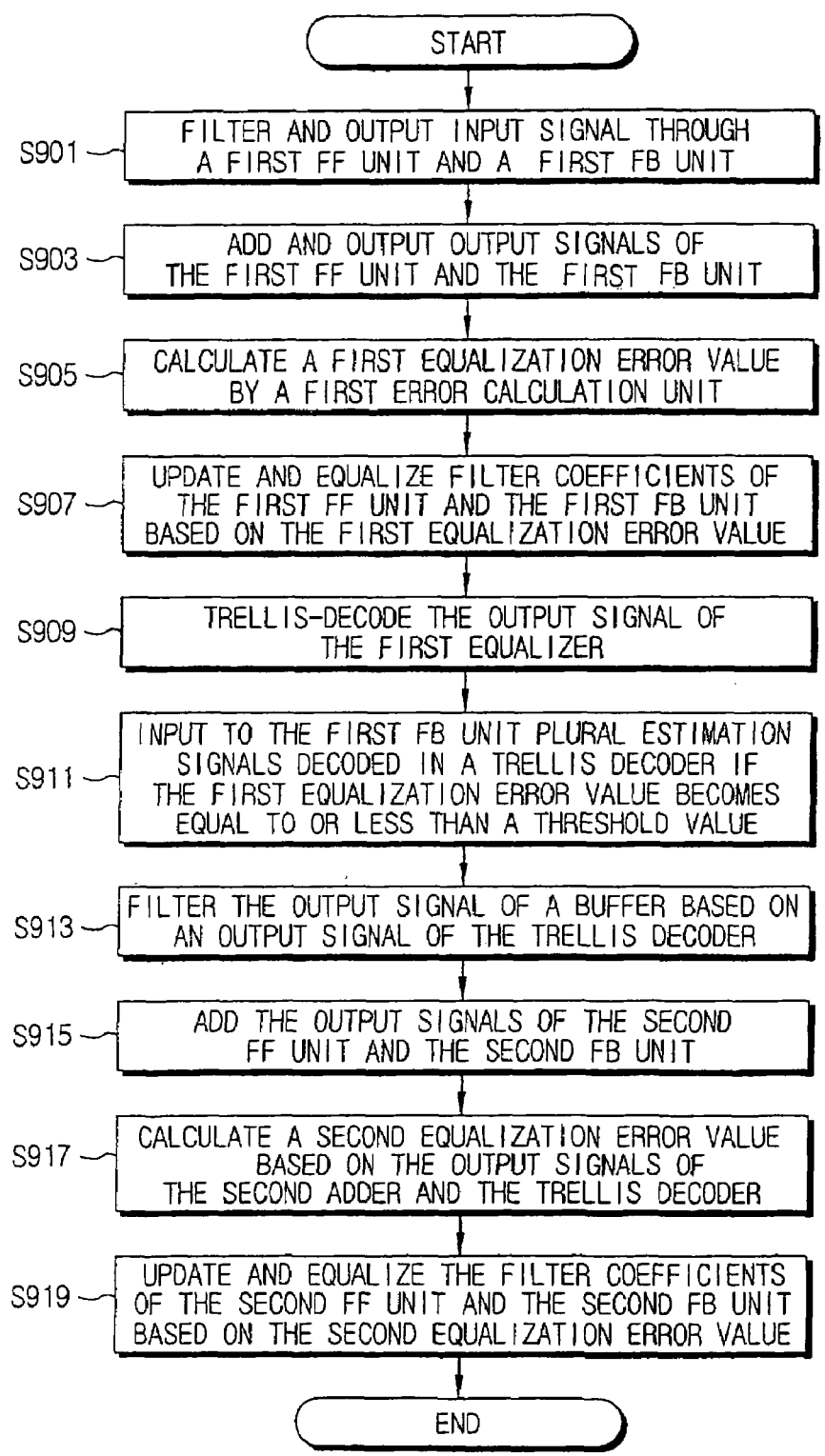
FIG. 10 is a flow chart illustrating a channel equalization method for the channel equalizer of FIG. 9, according to an embodiment of the present invention.

A channel equalization method for the channel equalizer 900, shown in FIG. 9, according to another embodiment of the present invention, will now be described in more detail, with reference to the flow chart of FIG. 10.

An input signal of the channel equalizer 900 is output to the first FF unit 911 and the first FB unit 913, and output with the pre-ghost and the post-ghost eliminated by respective filters (S901). The signals output from the first FF unit 911 and the first FB unit 913 are added by the first adder 915 (S903). Thereafter, an output signal of the first adder 915 is determined to correspond to a certain level, by the first level decision unit 917, and output as a level-determined signal. The first error calculation unit 919 calculates a first equalization error value based on the level-determined signal and the added signal output from the first adder 915 (S905).

The first equalization error value calculated in the first error calculation unit 919 is output to the first FF unit 911 and the first FB unit 913 to update respective filter tap coefficients. The signal inputted to the first equalization unit 910 is, thereby, gradually equalized, with filter tap coefficients being repeatedly updated (S907).

The first adder 915 adds the output signals of the first FF unit 911 and the first FB unit 913 and outputs an output signal of the first equalizer 910.

The Trellis decoder 930 Trellis-decodes the output signal of the first equalizer 910 (S909).

Trellis controller 931 controls the Trellis decoder 930 to output plural Trellis-decoded estimation signals to the first FB unit 913, if the first equalization error value output from the first error calculation unit 919, becomes less than or equal to a threshold value.

That is, as shown in FIG. 4, plural estimation signals d0, d1, . . ., and dn, decoded in plural decoding depth states, and arbitrarily set out of the entire decoding depth states of 0, 1, 2, 3, 4, . . . , and N of the Trellis decoder 930, are output to plural filter taps of the first FB unit 913, respectively, in consideration of a traceback delay time (S911).

Accordingly, the plural estimation signals of the Trellis decoder 930, with a low symbol error rate, are output to the plural filter taps of the first FB unit 913, according to the control of the Trellis controller 931 to prevent occurrences of error propagation phenomenon occurring in the first FB unit 913, due to the error of the first level decision unit 917.

The second FF unit 971, of the second equalizer 970, eliminates the pre-ghost for an input signal of the channel equalizer 900, output from the buffer 950. The second FB unit 973 eliminates the post-ghost of the channel equalizer 900, output from the buffer 950, based on the Trellis-decoded signal from the Trellis decoder 930 (S913).

The second adder 975 adds and outputs the output signals of the second FF unit 971 and the second FB unit 973 (S915).

The second error calculation unit 979 calculates a second equalization error value, based on the signal output from the second adder 975 and the Trellis-decoded signal output from the Trellis decoder 930 (S917). The calculated second equalization error value is output to the second FF unit 971 and the second FB unit 973. The second FF unit 971 and the second FB unit 973 update their respective filter tap coefficients, corresponding to the inputted second equalization error value, and implement the equalization of the second equalizer 970 (S919).

That is, the second FB unit 973 and the second error calculation unit 979, of the second equalizer 970, input the low symbol error rate Trellis-decoded signal, Trellis-decoded by the Trellis decoder 930, so that the equalization performance can be enhanced over conventional equalization systems.

The channel equalizers, according to the diverse embodiments of the present invention, interact with the Trellis decoder so as to enhance the equalization performance.

According to embodiments of the present invention, the channel equalizer has the first and second equalizers interacting with the Trellis decoder to enhance the equalization performance and equalization speed.

Estimation signals output from at least one or more states, out of the decoding depth states of 0, 1, 2, . . . , and N of the Trellis decoder, are output to their respective filter taps, corresponding to the first FB unit to prevent the error propagation phenomenon of the first FB unit.

The decoded signal outputted from the Trellis decoder is output to the second FB unit so that the error propagation phenomenon of the first FB unit can be prevented.

The second equalization error value is calculated based on the decoded signal output from the Trellis decoder so that the equalization performance can be enhanced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A channel equalizer for a single-carrier receiver, comprising:

a first equalizer having a first feed forward (FF) unit to eliminate a pre-ghost of an input signal and a first feedback (FB) unit to eliminate a post-ghost of the input signal;

a first error calculation unit to calculate a first equalization error value based on an added signal of an output signal of the first FF unit and an output signal of the first FB unit;

a Trellis decoder for Trellis-decoding an output signal of the first equalizer;

a second equalizer having a second FF unit to eliminate the pre-ghost of the input signal and a second FB unit to eliminate the post-ghost of the input signal based on an output signal of the Trellis decoder; and a Trellis controller to control the Trellis decoder to output to the first FB unit an estimation signal outputted in a predetermined decoding depth state of the Trellis decoder if the first equalization error value becomes less than or equal to a threshold value.

2. The channel equalizer as claimed in claim 1, wherein the Trellis decoder has an entire decoding depth of N and an entire traceback delay symbol length of N×K, with N and K being natural numbers.

3. The channel equalizer as claimed in claim 1, wherein an estimation signal output in a state of decoding depth n of the Trellis decoder is output to a $\{1+(n\times K)\}^{th}$ filter tap of the first FB unit, with n being a natural number and n≦N and with N and K being natural numbers.

4. The channel equalizer as claimed in claim 1, further comprising a second error calculation unit to calculate a second equalization error value based on the output signal of the Trellis decoder.

5. A channel equalizer for a single-carrier receiver, comprising:

a first equalizer having a first feed forward (FF) unit to eliminate a pre-ghost of an input signal and a first feedback (FB) unit to eliminate a post-ghost of the input signal;

a first error calculation unit to calculate a first equalization error value based on an added signal of an output signal of the first FF unit and an output signal of the first FB unit;

a Trellis decoder for Trellis-decoding an output signal of the first equalizer;

a second equalizer having a second FF unit to eliminate the pre-ghost of the input signal and a second FB unit to eliminate the post-ghost of the input signal based on an output signal of the Trellis decoder; and a Trellis controller to control the Trellis decoder to output to the first FB unit plural estimation signals output in plural states of the entire decoding depths of the Trellis decoder, if the first equalization error value becomes less than or equal to a threshold value.

6. The channel equalizer as claimed in claim 5, wherein an estimation signal output in a state of decoding depth n of the Trellis decoder is output to a $\{1+(n\times K)\}^{th}$ filter tap of the first FB unit, with n being a natural number, with n≦N, and with the plural estimation signals output in the plural states being output to corresponding filter taps of the first FB unit, respectively, with N and k being natural numbers.

7. A channel equalization method for signal-carrier receiver, comprising:

first equalizing an input signal by eliminating pre-ghost and post-ghost of the input signal using a first feed forward (FF) unit and a first feedback (FB) unit, and by first error calculating for calculating a first equalization error value based on a signal resulting from the addition of an output signal of the first FF unit and an output signal of the first FB unit;

Trellis-decoding a result of the first equalizing of the input signal;

feedback by outputting to the first FB unit an estimation signal output in a predetermined decoding depth state of the Trellis decoder if the first equalization error value becomes less than or equal to a threshold value; and second equalizing a result of the Trellis-decoding, comprising eliminating the pre-ghost of the input signal in a second FF unit and eliminating the post-ghost of the input signal in a second FB unit based on the result of the Trellis-decoding.

8. The channel equalization method as claimed in claim 7, further comprising storing the input signal for a certain period of time.

9. The channel equalization method as claimed in claim 7, wherein the Trellis decoder has an entire decoding depth of N and an entire traceback delay symbol length of N×K, with N and K being natural numbers.

10. The channel equalization method as claimed in claim 7, wherein, in the feedback, an estimation signal output in a state of decoding depth n (n≦N) of the Trellis decoder is output to a $\{1+(n\times K)\}^{th}$ filter tap of the first FB unit, with n being a natural number, with n≦N and with N and K being natural numbers.

11. The channel equalization method as claimed in claim 7, wherein the second equalization further comprises second error calculating for calculating a second equalization error value based on the Trellis-decoding result.

12. A receiver comprising a demodulator, a phase recovery unit, a decoder to decode the phase recovered signal, and a channel equalizer to compensate for channel distortions in the demodulated received signal according to the method of claim 7.

13. A channel equalization method for a signal-carrier receiver, comprising:

first equalizing an input signal by eliminating pre-ghost and post-ghost of the input signal using a first feed forward (FF) unit and a first feedback (FB) unit, and by first error calculating for calculating a first equalization error value based on a signal resulting from the addition of an output signal of the first FF unit and an output signal of the first FB unit;

Trellis-decoding a result of the first equalizing of the input signal;

feedback by outputting to the first FB unit plural estimation signals output in plural states of the entire decoding depths of the Trellis decoder, if the first equalization error value becomes less than or equal to a threshold value; and second egualizing a result of the Trellis-decoding, comprising eliminating the pre-ghost of the input signal in a second FF unit and eliminating the post-ghost of the input signal in a second FB unit based on the the result of the Trellis-decoding.

14. The channel equalization method as claimed in claim 13, wherein, in the feedback, an estimation signal output in a state of decoding depth n (n≦N) of the Trellis decoder is output to a $\{1+(n\times K)\}^{th}$ filter tap of the first FB unit, with n being a natural number, with n≦N, and with the plural estimation signals output in the plural states being output to corresponding filter taps of the first FB unit, respectively, with N and K being natural numbers.

15. A channel equalizer for a single-carrier receiver, comprising:

a first equalizer having a first FF unit to eliminate a pre-ghost of an input signal, a first FB unit to eliminate a post-ghost of the input signal, and a first error calculation unit to calculate a first equalization error value based on an added signal of an output signal of the first FF unit and an output signal of the first FB unit;

a buffer to store the input signal input to the first equalizer for a certain period of time;

a Trellis decoder having an entire decoding depth of N and an entire traceback delay symbol length of N×K, with N and K being natural numbers, and Trellis-decode an output signal of the first equalizer;

a Trellis controller to control the Trellis decoder to output to the first FB unit an estimation signal output in a predetermined decoding depth state of the Trellis decoder if the first equalization error value becomes less than or equal to a threshold value; and a second equalizer having a second FF unit to eliminate the pre-ghost of the input signal output from the buffer and a second FB unit to eliminate the post-ghost of the input signal based on an output of the Trellis decoder.

16. The channel equalizer as claimed in claim 15, wherein the estimation signal output in a state of decoding depth n of the Trellis decoder is output to a $\{1+(n\times K)\}^{th}$ filter tap of the first FB unit, with n being a natural number and with n≦N.

17. A receiver comprising a demodulator, a phase recovery unit, a decoder, and a channel equalizer, to compensate for channel distortions in a demodulated received signal, according to claim 15.

18. A channel equalizer for a single-carrier receiver, comprising:

a first equalizer having a first feed forward (FF) unit to eliminate a pre-ghost of an input signal, a first feedback (FB) unit to eliminate a post-ghost of the input signal, and a first error calculation unit to calculate a first equalization error value based on an added signal of an output signal of the first FF unit and an output signal of the first FB unit;

a buffer to store the input signal input to the first equalizer for a certain period of time;

a Trellis decoder having an entire decoding depth of N and an entire traceback delay symbol length of N×K, with N and K being natural numbers, and Trellis-decode an output signal of the first equalizer;

a Trellis controller to control the Trellis decoder to output to the first FB unit plural estimation signals output in plural states of entire decoding depths of the Trellis decoder, if the first equalization error value becomes less than or equal to a threshold value; and a second equalizer having a second FF unit to eliminate the pre-ghost of the input signal output from the buffer and a second FB unit to eliminate the post-ghost of the input signal, based on an output of the Trellis decoder.

19. The channel equalizer as claimed in claim 18, wherein an estimation signal output in a state of decoding depth n of the Trellis decoder is output to a $\{1+(n\times K)\}^{th}$ filter tap of the first FB unit, with n being a natural number, with n≦N, and with the plural estimation signals output in the plural states being output to corresponding filter taps of the first FB unit, respectively.

20. A receiver comprising a demodulator, a phase recovery unit, a decoder, and a channel equalizer to compensate for channel distortions in a demodulated received signal, according to claim 18.

21. A channel equalizer for a single-carrier receiver, comprising:

a first equalizer having a first feed forward (FF) unit to eliminate a pre-ghost of an input signal, a first feedback (FB) unit to eliminate a post-ghost of the input signal, and a first error calculation unit to calculate a first equalization error value based on an added signal of an output signal of the first FF unit and an output signal of the first FB unit;

a buffer for storing the input signal input to the first equalizer for a certain period of time;

a Trellis decoder having an entire decoding depth of N and an entire traceback delay symbol length of N×K, with N and K being natural numbers, and Trellis-decode an output signal of the first equalizer;

a Trellis controller to control the Trellis decoder to output to the first FB unit an estimation signal output in a predetermined decoding depth state of the Trellis decoder if the first equalization error value becomes less than or equal to a threshold value; and a second equalizer having a second FE unit to eliminate the pre-ghost of the input signal output from the buffer, a second FB unit to eliminate the post-ghost of the input signal based on an output of the Trellis decoder, and a second error calculation unit to calculate a second equalization error value, based on the output of the Trellis decoder.

22. The channel equalizer as claimed in claim 21, wherein an estimation signal output in a state of decoding depth n of the Trellis decoder is output to a $\{1+(n\times K)\}^{th}$ filter tap of the first FB unit, with n being a natural number and with n×N.

23. A receiver comprising a demodulator, a phase recovery unit, a decoder, and a channel equalizer, to compensate for channel distortions in a demodulated received signal, according to claim 21.

24. A channel equalizer for a single-carrier receiver, comprising:

a first equalizer having a first feed forward (FF) unit to eliminate a pre-ghost of an input signal, a first feed back (FB) unit to eliminate a post-ghost of the input signal, and a first error calculation unit to calculate a first equalization error value based on an added signal of an output signal of the first FF unit and an output signal of the first FB unit;

a buffer to store the input signal input to the first equalizer for a certain period of time;

a Trellis decoder having an entire decoding depth of N and an entire traceback delay symbol length of N×K, with N and K being natural numbers, and to Trellis-decode an output signal of the first equalizer;

a Trellis controller to control the Trellis decoder to input to the first FB unit plural estimation signals output in plural states of the entire decoding depths of the Trellis decoder, if the first equalization error value becomes less than or equal to a threshold value; and a second equalizer having a second FF unit to eliminate the pre-ghost of the input signal output from the buffer, a second FB unit to eliminate the post-ghost of the input signal based on an output of the Trellis decoder, and a second error calculation unit to calculate a second equalization error value based on the output of the Trellis decoder.

25. The channel equalizer as claimed in claim 24, wherein an estimation signal output in a state of decoding depth n of the Trellis decoder is output to a $\{1+(n\times K)\}^{th}$ filter tap of the first FB unit, with n being a natural number, with n≦N, and with the plural estimation signals output in the plural states are output to corresponding filter taps of the first FB unit, respectively.

26. A receiver comprising a demodulator, a phase recovery unit, a decoder, and a channel equalizer, to compensate for channel distortions in a demodulated received signal, according to claim 24.

27. A receiver, comprising:
a demodulator to convert a received signal to a baseband signal;
a channel equalizer to compensate for channel distortions in the demodulated received signal;
a phase recovery unit to recover a phase of the channel equalized signal; and
a decoder to decode the phase recovered signal,
wherein the channel equalizer further comprises a first equalizer having a first feed forward (FF) unit to eliminate a pre-ghost of a channel equalizer input signal and a first feedback (FB) unit to eliminate a post-ghost of the channel equalizer input signal, a first error calculation unit to calculate a first equalization error value based on an added signal of an output signal of the first FF unit and an output signal of the first FB unit, a Trellis decoder to Trellis-decode an output signal of the first equalizer, a second equalizer having a second FF unit to eliminate the pre-ghost of the channel equalizer channel equalizer signal and a second FB unit to eliminate the post-ghost of the channel equalizer input signal based on an signal decoded by the Trellis decoder, and a Trellis controller to control the Trellis decoder to output to the first FB unit an estimation signal outputted in a predetermined decoding depth state of the Trellis decoder if the first equalization error value becomes less than or equal to a threshold value.

28. The receiver as claimed in claim 27, wherein, in the channel equalizer, the Trellis decoder has an entire decoding depth of N and an entire traceback delay symbol length of N×K, with N and K being natural numbers.

29. The receiver as claimed in claim 27, wherein, in the channel equalizer, an estimation signal output in a state of decoding depth n of the Trellis decoder is output to a $\{1+(n\times K)\}^{th}$ filter tap of the first FB unit, with n being a natural number and $n \leq N$ and with N and K being natural numbers.

30. The channel equalizer as claimed in claim 27, wherein the channel equalizer, further comprises a second error calculation unit to calculate a second equalization error value based on the output signal of the Trellis decoder.

31. A receiver, comprising:
a demodulator to convert a received signal to a baseband signal;
a channel equalizer to compensate for channel distortions in the demodulated received signal;
a phase recovery unit to recover a phase of the channel equalized signal; and
a decoder to decode the phase recovered signal,
wherein the channel equalizer further comprises a first equalizer having a first feed forward (FF) unit to eliminate a pre-qhost of a channel equalizer input signal and a first feedback (FB) unit to eliminate a post-ghost of the channel equalizer input signal, a first error calculation unit to calculate a first equalization error value based on an added signal of an output signal of the first FF unit and an output signal of the first FB unit, a Trellis decoder to Trellis-decode an output signal of the first equalizer, a second equalizer having a second FF unit to eliminate the pre-ghost of the channel equalizer channel equalizer signal and a second FB unit to eliminate the post-ghost of the channel equalizer input signal based on an signal decoded by the Trellis decoder, and a Trellis controller to control the Trellis decoder to output to the first FB unit plural estimation signals output in plural states of the entire decoding depths of the Trellis decoder, if the first equalization error value becomes less than or equal to a threshold value.

32. The channel equalizer as claimed in claim 31, wherein, in the channel equalizer, an estimation signal output in a state of decoding depth n of the Trellis decoder is output to a $\{1+(n\times K)\}^{th}$ filter tap of the first FB unit, with n being a natural number, with $n \leq N$ and with the plural estimation signals output in the plural states being output to corresponding filter taps of the first FB unit, respectively, with N and K being natural numbers.

* * * * *

UNITED STATES PATENT AND TRADEMARK OFFICE
CERTIFICATE OF CORRECTION

PATENT NO. : 7,274,745 B2 Page 1 of 1
APPLICATION NO. : 10/671730
DATED : September 25, 2007
INVENTOR(S) : Yong-deok Chang et al.

It is certified that error appears in the above-identified patent and that said Letters Patent is hereby corrected as shown below:

Column 11, Line 23, after "n≤N" insert --,--.

Column 11, Line 56, change "k" to --K--.

Column 11, Line 57, after "for" insert --a--.

Column 12, Line 21, after "n≤N" insert --,--.

Column 12, Line 48, change "egualizing" to --equalizing--.

Column 12, Line 51, before "result" delete "the".

Column 14, Line 15, change "FE" to --FF--.

Column 14, Line 20, change "value," to --value--.

Column 14, Line 25, change "nxN." to --n≤N.--.

Column 15, Line 36, after "n≤N" insert --,--.

Column 16, Line 11, change "pre-qhost" to --pre-ghost--.

Column 16, Line 33, after "n≤N" insert --,--.

Signed and Sealed this

Fifth Day of August, 2008

JON W. DUDAS
*Director of the United States Patent and Trademark Office*